(12) United States Patent
Sharma

(10) Patent No.: US 8,769,572 B2
(45) Date of Patent: Jul. 1, 2014

(54) SYSTEM AND METHOD FOR PROVIDING AN INTERACTIVE PROGRAM GUIDE HAVING DATE AND TIME TOOLBARS

(75) Inventor: Somesh Sharma, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 446 days.

(21) Appl. No.: 12/054,243

(22) Filed: Mar. 24, 2008

(65) Prior Publication Data

US 2009/0241145 A1  Sep. 24, 2009

(51) Int. Cl.
*H04N 5/44* (2011.01)

(52) U.S. Cl.
USPC .............................................. 725/39; 725/47

(58) Field of Classification Search
None
See application file for complete search history.

(56) References Cited

U.S. PATENT DOCUMENTS

| 6,268,849 | B1* | 7/2001 | Boyer et al. .................... 725/40 |
| 7,739,711 | B2* | 6/2010 | Finseth et al. .................. 725/52 |
| 2002/0184630 | A1* | 12/2002 | Nishizawa et al. ............. 725/44 |
| 2005/0039142 | A1* | 2/2005 | Jalon et al. .................... 715/823 |
| 2006/0047816 | A1* | 3/2006 | Lawton et al. ................ 709/227 |
| 2007/0050810 | A1* | 3/2007 | Imaizumi ........................ 725/37 |
| 2008/0271080 | A1* | 10/2008 | Gossweiler et al. ........... 725/47 |
| 2009/0007198 | A1* | 1/2009 | Lavender et al. ............... 725/91 |
| 2009/0150938 | A1* | 6/2009 | Clancy ........................... 725/47 |

* cited by examiner

*Primary Examiner* — Rong Le

(57) ABSTRACT

Embodiments of the present disclosure are directed to a system and method for receiving a request for TV programming schedule information via an interactive programming guide, obtaining the TV programming schedule information associated with a period of time, displaying one or more program icons having the TV programming schedule information associated with the interactive programming guide; adjusting at least one of a date toolbar for selecting one or more dates and a time toolbar for selecting one or more time periods of a day in response to receiving one or more commands; and displaying the one or more program icons having the TV programming schedule information associated with the interactive programming guide based at least on one of the selected one or more dates and the selected one or more time periods of the day.

18 Claims, 11 Drawing Sheets

FIG. 3

Interactive TV Program Guide — Actor: [ ] Genre: [All Categories ▼] Title: [ ] Channel: [ ] [Quit]

[My Favourites] [Family] [Kids Zone] [News] [Movies] [Sports] [Pay Per View]

| Channel | 08:00 PM | 08:30 PM | 09:00 PM | 09:30 PM | 10:00 PM | 10:30 PM | 11:00 PM | 11:30 PM | 12:00 AM |
|---|---|---|---|---|---|---|---|---|---|
| ABC 001 / 30 Jan Wed | Next Best Thing: Who Is the Greatest Celebrity Impersonator? | | American Inventor | | Local Programming | | Local Programming | | Nightline |
| ABC Fam 002 / 30 Jan Wed | My Big Fat Greek Wedding | | | My Big Fat Greek Wedding | | | 700 Club | Smallville | |
| AE 003 / 30 Jan Wed | CSI: Miami | | CSI: Miami | | The Sopranos | | Dog the Bounty Hunter | | Local Programming |
| AMC 004 / 30 Jan Wed | Goodfellas | | | | Mad Men | | | | Local Programming |
| Animal 005 / 30 Jan Wed | Planet Earth | | Animal Precinct | | Most Extreme Fooled by Nature | | Planet Earth | | |
| BBC 006 / 30 Jan Wed | Footballers Wive$ | | Hollyoaks | | Hollyoaks | | Footballers Wive$ | | |
| BET 007 / 30 Jan Wed | Next Friday | S.O.B. | We Got to Do Be | Take the Cake | The 5ive | Hell Date | Next Friday | | S.O.B. |
| Bravo 008 / 30 Jan Wed | Top Chef | | | Top Chef Watch What Happens | | | To Be Announced | To Be Announced | |
| Cartoon 009 / 30 Jan Wed | Pokeman... | Pokemon Diamond | Futurama | Family Guy | Rob... | Aqu... | Bleach | | Family Guy |
| CBS 10 / 30 Jan Wed | King of Queens | | Criminal Minds | | | CSI: NY | | | Local Programming |
| CineMax 11 / 30 Jan Wed | The Clueless | | The Fast and the Furious: Tokyo Drift | | | | Sin City Diaries | | |
| CMT 012 / 30 Jan Wed | Dukes of Hazard | | Country Fried... | | Country Fried H... | | Born Country | | |
| CNBC 013 / 30 Jan Wed | Fast Money | | Big Mac Inside the McDonald's Empire Big Idea With Donny Deutsch | | | | | Mad Money | |
| CNN 014 / 30 Jan Wed | Paula Zahn Now News Highlights | | Larry King Live | | | Anderson Cooper 360 | | | |
| Comedy 015 / 30 Jan Wed | Daily Show | | | Colbert Report | Chappell's | Show South Park | | Lil' Bush | |
| CW 16 / 30 Jan Wed | America's Next Top Model | | | Local Programming | | | | Local Programming | |
| Discovery 017 / 30 Jan Wed | Really Big Things | New MythBusters | Cash Cab | Cash Cab | MythBusters | | Really Big Things | | New MythBusters |
| Disney 018 / 30 Jan Wed | An Extremely Goofy Movie | | | That's So Raven | | Suite Life of Z... | Hannah Montana | Kim Possible | Lizzy McGuire |
| E 19 / 30 Jan Wed | True Hollywood Story | | The Soup Presents | Sunset Tan | | E! News | Chelsea Lately | Daily 10 | |
| ESPN 020 / 30 Jan Wed | Ultimate NASCAR | | BaseballTonight | | SportsCenter | | NFL Li.. | | Local Programming |
| ABC 001 / 30 Jan Wed | Next Best Thing: Who Is the Greatest Celebrity Impersonator? | | American Inventor | | Local Programming | | Local Programming | | Nightline |
| ABC Fam 002 / 30 Jan Wed | My Big Fat Greek Wedding | | | My Big Fat Greek Wedding | | | 700 Club | Smallville | |
| AE 003 / 30 Jan Wed | CSI: Miami | | CSI: Miami | | The Sopranos | | Dog the Bounty Hunter | | Local Programming |
| AMC 004 / 30 Jan Wed | Goodfellas | | | | Mad Men | | | | Local Programming |
| Animal 005 / 30 Jan Wed | Planet Earth | | Animal Precinct | | Most Extreme Fooled by Nature | | Planet Earth | | |
| BBC 006 / 30 Jan Wed | Footballers Wive$ | | Hollyoaks | | Hollyoaks | | Footballers Wive$ | | |
| BET 007 / 30 Jan Wed | Next Friday | S.O.B. | We Got to Do Be | Take the Cake | The 5ive | Hell Date | Next Friday | | S.O.B. |
| Bravo 008 / 30 Jan Wed | Top Chef | | | Top Chef Watch What Happens | | | To Be Announced | To Be Announced | |
| Cartoon 009 / 30 Jan Wed | Pokeman... | Pokemon Diamond | Futurama | Family Guy | Rob... | Aqu... | Bleach | | Family Guy |

Quick Date/Time Selection: ▶ Today | This Weekend | ▶ Now | ▶ Morning | ▶ Prime Time | ▶ Late Night 29 Jan, 30 Jan, 31 Jan, 01 Feb, 02 Feb, 03 Feb, 04 Feb, 05 Feb, 06 Feb, 07 Feb, 08 Feb, 09 Feb, 10 Feb, 11 Feb, 12 Feb, 00, 01, 02, 03, 04, 05, 06, 07, 08, 09, 10, 11, 12, 01, 02, 03, 04, 05, 06, 07, 08, 09, 10, 11, 12, 01, 02, 03, 04, 05,

FIG. 3

| | | 08:00 PM | 08:30 PM |
|---|---|---|---|
| ABC 001 | 30 Jan Wed | Next Best Thing: Who Is the Greatest Celebrity Impersonator? | |
| ABC Fam 002 | 30 Jan Wed | My Big Fat Greek Wedding | |
| AE 003 | 30 Jan Wed | CSI: Miami | |
| AMC 004 | 30 Jan Wed | Goodfellas | |
| Animal 005 | 30 Jan Wed | Planet Earth | |
| BBC 006 | 30 Jan Wed | Footballers Wive$ | |
| BET 007 | 30 Jan Wed | Next Friday | S.O.B. |
| Bravo 008 | 30 Jan Wed | Top Chef | |

Interactive TV Program Guide

My Favourites | Family | Actor:

| | | 08:00 PM | 08:30 PM | 09:00 PM | 09:30 PM |
|---|---|---|---|---|---|
| ABC 001 | 30 Jan | Next Best Thing: Who Is the Greatest Celebrity Impersonator? | | American Inventor | |
| | 31 Jan | My Big Fat Greek Wedding | | | My Big Fat Greek Wedding |
| | 01 Feb | CSI: Miami | | CSI: Miami | |
| | 02 Feb | Goodfellas | | | |
| | 03 Feb | Planet Earth | | Animal Precinct | |
| | 04 Feb | Footballers Wive$ | | Hollyoaks | |
| | 05 Feb | Next Friday | S.O.B. | We Got to Do... | Take the Cake |
| ABC Fam 002 | 30 Jan | Top Chef | | | Top Chef: Watch What |
| | 31 Jan | Pokemon... | Pokemon Diamond | Futurama | Family Guy |
| | 01 Feb | King of Queens | | Criminal Minds | |
| | 02 Feb | The Clueless | | | The Fast and the Furious |
| | 03 Feb | Dukes of Hazzard | | Country Fried... | |
| | 04 Feb | FastMoney | | Big Mac: Inside the McDonald's Empire Big Idea | |
| | 05 Feb | Paula Zahn Now | | Larry King Live | |

FIG. 4D

| | | 08:00 PM | 08:30 PM | 09:00 PM |
|---|---|---|---|---|
| ABC 001 | 30 Jan Wed | Next Best Thing: Who Is the Greatest Celebrity Impersonator? | | American Inventor |
| ABC Fam 002 | 30 Jan Wed | My Big Fat Greek Wedding | | |
| AE 003 | 30 Jan Wed | CSI: Miami | | CSI: Miami |
| AMC 004 | 30 Jan Wed | Goodfellas | | |
| Animal 005 | 30 Jan Wed | | | Precinct |
| BBC 006 | 30 Jan Wed | | | aks |
| BET 007 | 30 Jan Wed | | | to Do Be... |
| Bravo 008 | 30 Jan Wed | | | |
| Cartoon 009 | 30 Jan Wed | | | ma |
| CBS 010 | 30 Jan Wed | | | al Minds |
| CineMax 011 | 30 Jan Wed | | | |
| CMT 012 | 30 Jan Wed | | | Fried H... |
| CNBC 013 | 30 Jan Wed | | | Mac: Inside the McD |
| CNN 014 | 30 Jan Wed | | | King Live |
| Comedy 015 | 30 Jan Wed | | | |
| CW 016 | 30 Jan Wed | | | |
| Discovery 017 | 30 Jan Wed | | | Cab |
| Disney 018 | 30 Jan Wed | | | |
| E | 30 Jan | True Hollywood Story | | The Soup Presen... |

My Favourites | Family

> Goodfellas ☒

8:00pm AMC 180min 1990 R

Cast: Robert De Niro, Joe Pesci, Ray Liotta, Lorraine Bracco

GoodFellas

The 1990 film is adapted from Nicholas Pileggi's fact-based bestseller Wiseguy, which the author describes as a "mob home movie." The plot traces the rise and fall of gangster Henry Hill (Ray Liotta) and the more prominent "goodfellas" in his world: Jimmy (Robert De Niro), who helps Henry fulfill his criminal ambitions, and Tommy (Oscar winner Joe Pesci), whose explosive temper stuns even his mobster friends. Karen: Lorraine Bracco. Paul: Paul Sorvino. Frankie: Frank Sivero ⊙ Preview ● Schedule Recording | ↗ Show Future Repeats ◎ Add Reminder | 📖 Add to Bookmark

Receiving a request for TV Programming
Schedule Information
902

Providing a Period of TV Programming
Schedule Information
904

Adjusting a Date Slider and/or a Time
Slider
906

Selecting One or More Program Cells for
TV Programming Schedule Information
908

FIG. 9

SYSTEM AND METHOD FOR PROVIDING AN INTERACTIVE PROGRAM GUIDE HAVING DATE AND TIME TOOLBARS

BACKGROUND INFORMATION

Televisions are popular with consumers. Because of advances in recent technology, television-watching has evolved into a multimedia experience. For example, consumers may now watch TV in high-definition on a large flat-screen with stereo surround sound in the comfort of their homes. To add to this comfort, interactive electronic on-screen programming guides have enabled viewers to quickly find and watch desired programs without bulky paper-bound guides. These interactive program guides allow viewers see what TV programs are playing, or scheduled, on all the channels available to the viewer. As a result, television-watching experience has become much more convenient and pleasurable. However, most interactive program guides have limited capabilities to enable a viewer to view TV programming schedule information. For example, some interactive program guides may allow a viewer to advance the TV programming schedule information in one hour increments, thus making it time consuming in the event that a viewer wants to select a date that is one week away. Therefore, the viewer may waste time and effort in selecting the desired dates/times for the interactive program guides. As a result, conventional systems and techniques for searching TV programs on interactive program guides are inadequate for finding out information on TV programming.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 3 depicts a screenshot of an interactive programming guide, in accordance with exemplary embodiments;

FIGS. 4A-4D depict screenshots of date toolbars of an interactive program guide, in accordance with exemplary embodiments;

FIG. 6 depicts a screenshot of a programming icon of an interactive program guide, in accordance with exemplary embodiments;

FIGS. 7A-7B depict screenshots of one or more quick buttons of an interactive program guide, in accordance with exemplary embodiments;

FIGS. 8A-8B depict screenshots of one or more queries of an interactive program guide, in accordance with exemplary embodiments; and FIG. 9 depicts a flowchart for providing an interactive programming guide, in accordance with exemplary embodiments.

These and other embodiments and advantages will become apparent from the following detailed description, taken in conjunction with the accompanying drawings, illustrating by way of example the principles of the various exemplary embodiments.

DETAILED DESCRIPTION OF EMBODIMENTS

A system and method may include various exemplary embodiments for providing a date toolbar and/or a time toolbar for an interactive programming guide in order to facilitate a viewer to search for TV programming by date and/or time. The system and method may also provide one or more quick buttons for an interactive programming guide in order to facilitate a viewer to efficiently search for TV programming. Moreover, the system and method may provide one or more interactive program icons for an interactive programming guide having one or more options to enhance a viewing experience.

The description below describes servers, set-top box, display devices, content provider, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. The functions described as being performed at various components may be performed at other components, and the various components may be combined and/or separated. Other modifications also may be made.

Figure 1:
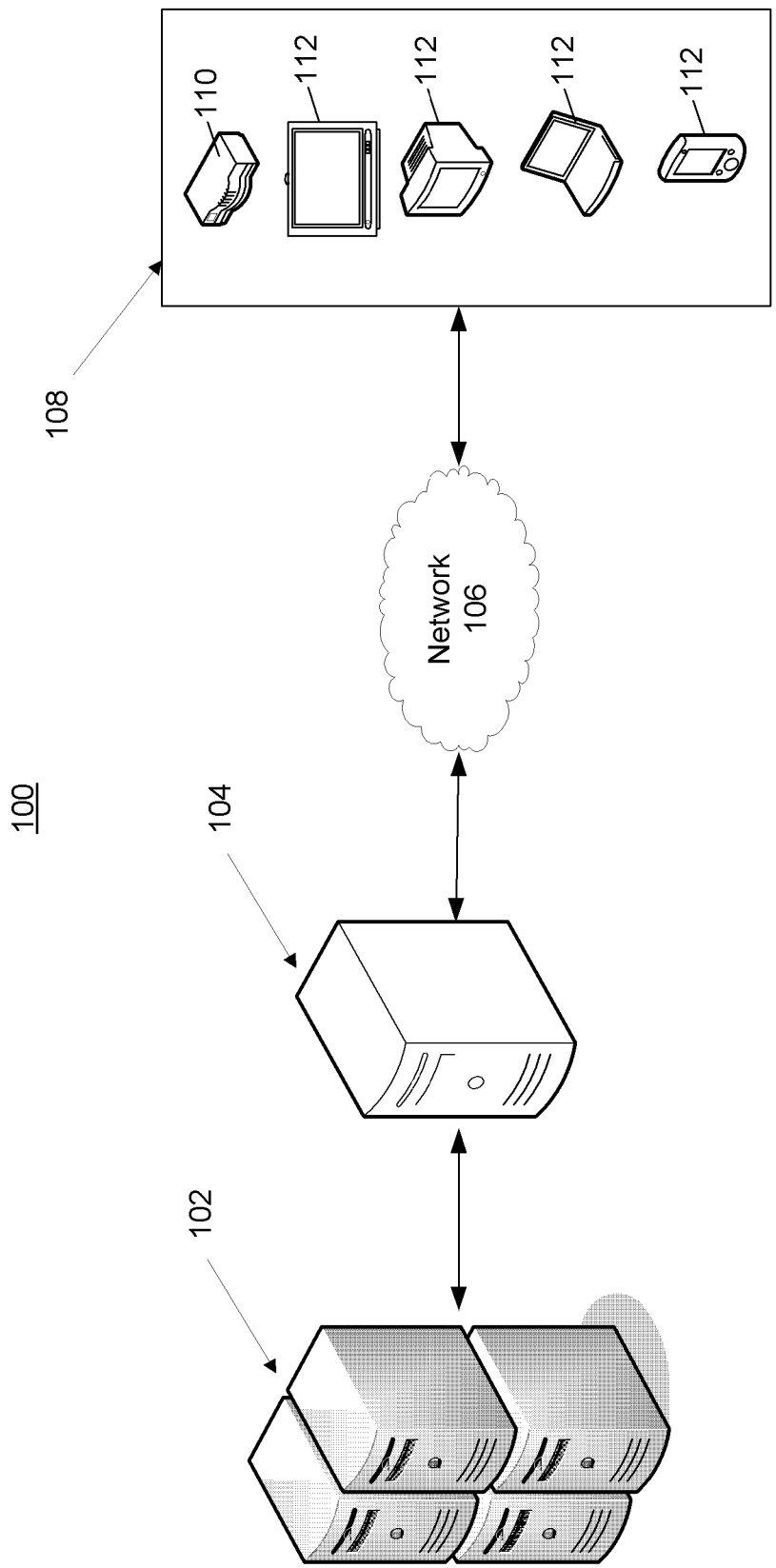
FIG. 1 depicts a system for providing an interactive programming guide having a date toolbar and/or time toolbar in accordance with exemplary embodiments.

FIG. 1 illustrates a system for providing an interactive programming guide having a date toolbar and/or time toolbar in accordance with exemplary embodiments. In an exemplary embodiment, the system 100 may include a content provider 102 coupled to an interactive programming guide server 104 which is coupled to a viewer premise 108 which may include a set-top box 110 and/or a display device 112 via a network 106. For example, the content provider 102 may provide programming schedule information associated with a period of time to the interactive programming guide server 104. The interactive programming guide server 104 may store the programming schedule information for a predetermined period of time (e.g., discarding the programming schedule information after two-weeks from the date of reception). The content provider 102 may also update the programming schedule information periodically (e.g., daily, weekly, monthly etc). The interactive programming guide server 104 may provide the programming schedule information to the display device 112 via the network 106.

The content provider 102 may be one or more servers including contents from content providers including, but not limited to, a radio company, a cable company (e.g., Cox Communication, Comcast Corp, and/or Adelphia Communication Corp), a satellite company (e.g., DirecTV and/or Dish Network), a broadcasting company (e.g., National Broadcasting Company (NBC), American Broadcasting Company (ABC), Fox Broadcasting Company (FOX), and/or Columbia Broadcasting System (CBS)) and/or other radio/television broadcasting companies.

The interactive programming guide server 104 may include one or more processors to provide an interactive programming guide to a viewer. For example, a viewer may download an interactive programming guide to a display device 112 associated with the viewer. Also, a viewer may download an interactive programming guide to a set-up box 110 to be displayed to the viewer. Further, the interactive programming guide server 104 may provide an interactive programming guide to a viewer via the set-up box 110 and/or the display device 112. In addition, the interactive programming guide server 104 may provide the interactive programming guide having one or more options. For example, one or more options associated with the interactive programming guide may include a date toolbar, time toolbar, program icons, actors, genres (e.g., family, kids' zone, movies, sports, or pay-per-view), title, channel, and/or other options to enhance a convenience of the interactive programming guide. Moreover, the interactive programming guide server 104 may provide one or more search options. For example, one or more search options associated with the interactive programming guide may include a keyword search, an actors/actress search, a title search, a channel search, a genre search, and/or other search options to facilitate a searching of the programming schedule information. The interactive programming guide server 104 may include one or more databases to store programming schedule information which may include a name, a channel, a date, a start time, duration, identification information, a description, and/or other information associated with one or more programming.

The interactive programming guide server 104 may utilize processor logic to identify programming schedule information to be displayed to a viewer. In another embodiment, the interactive programming guide server 104 may also include additional processing logic to sort and index the programming schedule information by, but not limited to, at least one of the following: date, time, program information, programming categories, actors, genres (e.g., action, drama, family, movies, sports, pay-per-view, etc), title, channel, reviews, social network information, event/show statistics, broadcast duration, ratings, popularity, closed-captioning information, etc. Storing and indexing may be achieved by parsing the programming schedule information, which may be transmitted as searchable metadata.

The interactive programming guide server 104 may provide programming schedule information in an interactive programming guide over the network 106 to the display device 112. The network 106 may be a wired network, a wireless network, or combinations thereof. For example, the network 106 may deliver the programming schedule information via a satellite network, a cable television network, an antenna, a cellular network, an optical fiber, a coaxial cable, or other manners of transporting programming schedule information. The programming schedule information may be an analog signal or a digital signal and may include audio signal, video signal, text signal, and/or combinations thereof. The programming schedule information may be, for example, a cable television programming, a broadcasting television programming, a radio programming, or may be digitized audio contents, video contents, text contents, etc., transported across the network 106 (e.g., in a computer network, transported in Internet Protocol packets via the Internet). In one embodiment, the programming schedule information may be received concurrently or non-concurrently with the TV program from the content provider 102. In another embodiment, the programming schedule information may be received separately from a third party, another program data source, or a combination thereof.

Although the interactive programming guide server 104 is depicted as one server, it should be appreciated that the contents of the interactive programming guide server 104 may be combined into fewer or greater numbers of servers (or server-like devices) and may be coupled to one or more data storage systems. Furthermore, the interactive programming guide server 104 may be local, remote, or a combination thereof to the display device 112. The interactive programming guide server 104 may also store additional data and/or information relevant for personalized functionalities. The interactive programming guide server 104 and the set-top box 110 may be shown as disparate elements, however, one having ordinary skill in the art would appreciate that interactive programming guide server 104 and set-up box 110 may be a single element. Moreover, functions performed at the interactive programming guide server 104 may also be performed at the set-top box 110.

The set-top box 110 may include a media control station and one or more databases. For example, the media control station may include a receiver to receive one or more commands/signals from a viewer, receive one or more media signals (e.g., streaming media, television programs) from the content providers 102 via the interactive programming server 104 and the network 106, and an output to provide media signals to display at the display device 112. Other variations and components may also be provided, such as a viewer interface, additional inputs/outputs, etc. Also for example, the one or more databases may store one or more content signals and/or an interactive programming guide received from the content provider 102 and/or the interactive programming guide server 104. Furthermore, the one or more databases may be local, remote, or a combination thereof to the set-top box 110. Additionally, the one or more databases may also store relevant information for personalized subscriber services. These may include user/viewer channel preferences, preferred TV programs/channels, preferred TV viewing times, and other preferred or customized information. Such information may be useful in providing additional customizations for enhanced TV-viewing experience. Other variations may also be provided.

In an exemplary embodiment, the interactive programming guide may be downloaded to the set-top box 110 and displayed to a viewer via the display device 112. The set-top box 110 may receive one or more commands/signals (e.g., via a remote control) from the viewer to adjust a date toolbar and/or a time toolbar associated with the interactive programming guide. Also, the set-top box 110 may receive one or more commands/signals to search for desired TV programming schedule information within the interactive programming guide. Moreover, the set-top box 110 may receive one or more commands/signals to activate one or more quick buttons associated with the interactive programming guide.

The display device 112 may include computers, desktop computers, laptop computers, televisions, telephones, digital telephones, analog telephones, cellular communication devices, facsimile devices, teletype (TTY) equipments, global positioning systems (GPS), workstations, mobile devices, handheld PCs, personal digital assistants (PDA), thin systems, fat systems, network appliances, paging devices, alert devices, interactive televisions, receivers, tuners, high definition (HD) televisions, HD receivers, and/or other devices that may allow a user to view and/or interactive with the interactive programming guide.

Figure 2:
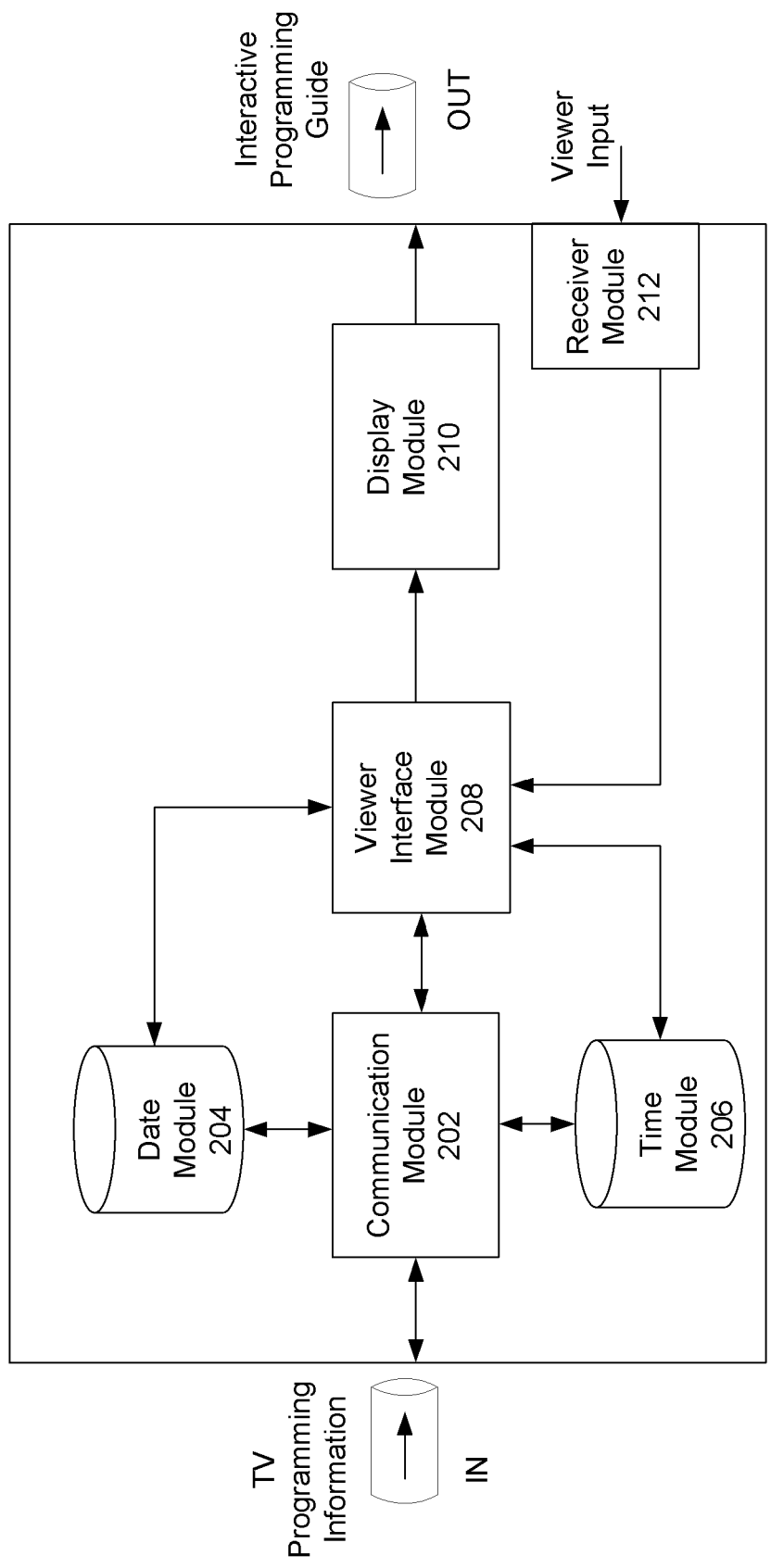
FIG. 2 depicts a block diagram of various modules of an interactive programming guide server for providing an interactive programming guide having date toolbar and/or time toolbar, in accordance with exemplary embodiments.

FIG. 2 illustrates a block diagram of various modules of an interactive programming guide server for providing an interactive programming guide having a date toolbar and/or time toolbar, in accordance with exemplary embodiments. In an exemplary embodiment, an interactive programming guide having a date toolbar and/or a time toolbar may be downloaded to a set-top box 110 and/or a display device 112 associated with the viewer. Also, the interactive programming guide having a date toolbar and/or a time toolbar may be maintained by the interactive programming guide server 104. The interactive programming guide server 104 may examine TV programming schedule information provided by the content provider 102 and may provide an interactive programming guide having a date toolbar and/or a time toolbar associated with the TV programming schedule information to a viewer.

For example, the interactive programming guide server 104 may include a communication module 202, a date module 204, a time module 206, a viewer interface module 208, a display module 210 and a receiver module 212. It is noted that the modules 202, 204, 206, 208, 210, and 212 are exemplary and the functions performed by one or more of the modules may be combined with that performed by other modules. The functions described herein as being performed by the modules 202, 204, 206, 208, 210, and 212 also may be separated and may be performed by other modules at devices local or remote to the interactive programming guide server 104.

The interactive programming guide server 104 may communicate with the content provider 102 via the communication module 202. For example, the communication module 202 may receive TV programming schedule information from the content provider 102. Also, the interactive programming guide server 104 may communicate with the display device 112 associated with a viewer via the receiver module 212, the viewer interface module 208 and/or the communication module 202. For example, a viewer may request TV programming schedule information associated with a selected date and/or time. The viewer request may be received by the receiver module 212 and may be processed by the viewer interface module 208. The processed viewer request may be transmitted to the content provider 102 by the communication module 202. Therefore, the content provider 102 may provide the interactive programming guide server 104 with TV programming schedule information associated with the selected date and/or time.

In an exemplary embodiment, the communication module 202 may receive the TV programming schedule information from the content provider 102. The TV programming schedule information may include at least one of the following information, for example, but not limited to, date, time, program information, programming categories, actors, genres (e.g., action, drama, family, movies, sports, pay-per-view, etc), title, channel, reviews, social network information, event/show statistics, broadcast duration, ratings, popularity, closed-captioning information, etc. The content provider 102 may transmit the TV programming schedule information continuously or intermittently. Also, the content provider 102 may transmit each TV programming schedule information separately and/or in a bundle.

The communication module 202 may transfer the TV programming schedule information to the date module 204. The date module 204 may process the TV programming schedule information before transmitting the TV programming schedule information to the viewer interface module 208. In an exemplary embodiment, the content provider 102 may provide TV programming schedule information associated with a time period (e.g., one or more days). The content provider 102 may provide a default number of days of TV programming schedule information. Also, a number of days of TV programming schedule information provided by the content provider 102 may be selected by a viewer. Further, the content provider 102 may provide TV programming schedule information associated with one or more days prior to the date a viewer is using the interactive programming guide. The content provider 102 may provide TV programming schedule information associated with one or more days subsequent to the date a viewer is using the interactive programming guide. For example, the content provider 102 may provide TV programming schedule information associated with one day prior to and/or 14 days subsequent of the date a viewer is using the interactive programming guide.

The date module 204 may store the TV programming schedule information for a predetermined period of time. For example, the date module 204 may store the TV programming schedule information for a predetermined period of time or a period of time selected by a viewer (e.g., an hour, a day, a week, a month, etc), before discarding the TV programming schedule information. Also, the date module 204 may buffer a certain number days of TV programming schedule information before forwarding the TV programming schedule information to the viewer interface module 208. The date module 204 may sort the TV programming schedule information based at least in part on the date associated with the one or more TV programming. For example, the date module 204 may sort the TV programming schedule information into a period of time (e.g., each day, each weekend, each week, etc). Also, the date module 204 may divide the TV programming schedule information to days prior to and/or days subsequent of a viewer using the interactive programming guide.

Furthermore, a viewer may select to sort the TV programming schedule information into a period of time (e.g., a day, 2 days, 8 days, 20 days, etc). In an exemplary embodiment, the date module 206 may provide a date toolbar associated with an interactive programming guide for the viewer to sort the TV programming schedule information based on a number of days. For example, the content provider 102 may provide 14 days of TV programming schedule information to the interactive programming guide server 104. The date toolbar for the interactive programming guide may be adjusted to cover a time period of the 14 day period. For example, a viewer may adjust a position of the toolbar to a selected day. Moreover, the viewer may adjust the position of the toolbar from day 1 (e.g., January 1) to day 6 (e.g., January 6), the interactive programming guide may display the TV programming schedule information for day 6 to the viewer. Also, a viewer may adjust a span of the date toolbar to cover one or more days of the 14 day period. For example, the viewer may adjust the span of the toolbar to cover 3 days of the 14 day period and the viewer may adjust the position of the date toolbar from day 6 to day 9. Thereby, the interactive programming guide may provide the TV programming schedule information from day 6 to day 9 to the viewer. It may be appreciated by one of skilled in the art that content provider 102 may provide various time periods of the TV programming to the interactive programming guide server 104.

The date module 204 may also provide one or more quick buttons associated with an interactive programming guide. For example, the date module 204 may provide one or more default quick buttons for the interactive programming guide. For example, the date module 204 may provide a "Today" quick button for the interactive programming guide, wherein a viewer may click on the "Today" quick button and the interactive programming guide server 104 may provide the viewer with TV programming schedule information for the date the viewer is using the interactive programming guide. Also, the date module 204 may provide a "This Weekend" quick button for the interactive programming guide, wherein a viewer may click on the "This Weekend" button and the interactive programming guide server 104 may provide the viewer with TV programming schedule information for the next weekend from the date the viewer is using the interactive programming guide. In another exemplary embodiment, the date module 204 may allow a viewer to customize one or more quick buttons associated with the interactive programming guide. For example, a viewer may customize a "Weekly" quick button associated with the interactive programming guide, wherein the interactive programming guide server 104 may provide the viewer with TV programming schedule information for the week associated with the date the viewer is using the interactive programming guide. Also, a viewer may customize a "10-Days" quick button associated with the interactive programming guide. For example, the viewer may customize the "10-Day" quick button to display 5 days prior to and 5 days subsequent of the date the viewer is using the interactive programming guide. Moreover, the viewer may customize the "10-Days" quick button to display 3 days prior to and 7 days subsequent of the date the viewer is using the interactive programming guide. The date module 204 may store the viewer customized quick buttons associated with the interactive programming guide for a period of time. In addition, the viewers may customize a "4-Day" quick button for the interactive programming guide and the interactive programming guide server 104 may provide the viewer with TV programming schedule information for the next 4 days from the date the viewer is using the interactive programming guide.

The communication module 202 may transfer the TV programming schedule information to the time module 206. The time module 206 may process the TV programming schedule information before transmitting the TV programming schedule information to the viewer interface module 208. In an exemplary embodiment, the content provider 102 may provide TV programming schedule information having time (e.g., a start time, an end time, and/or a duration) associated with one or more TV programming. For example, the content provider 102 may provide TV programming schedule information having show time associated with TV programming within a default number of days. Also, the content provider 102 may provide the show time associated with TV programming for a number of days selected by a viewer. Further, the content provider 102 may provide the show time associated with TV programming of one or more days prior to the date a viewer is using the interactive programming guide. The content provider 102 may provide the show time associated with TV programming of one or more days subsequent to the date a viewer is using the interactive programming guide. For example, the content provider 102 may provide the show time associated with TV programming of one day prior to and/or 14 days subsequent of the date a viewer is using the interactive programming guide.

The time module 206 may store the show time associated with TV programming for a predetermined period of time of a day. For example, the time module 206 may store the show time associated with TV programming for an hour, a day, a week, a month etc, before discarding the show time associated with TV programming. Also, the time module 204 may buffer the show time associated with TV programming for a certain number of days before forwarding the show time associated with TV programming to the viewer interface module 208. The time module 206 may sort the show time associated with TV programming. For example, the time module 206 may sort the show time associated with TV programming into each day, each weekend, each week, etc. Also, the time module 206 may divide the show time associated with TV programming to days prior to and/or days subsequent of a viewer using the interactive programming guide.

Also, a viewer may select to sort the show time associated with TV programming into a desired number of days. In an exemplary embodiment, a viewer may select to sort the show time associated with TV programming into 3 days, 5 days, 10 days, etc. The time module 206 may provide a time toolbar associated with the interactive programming guide for the viewer to sort the show time associated with the TV programming. The time toolbar associated with the interactive programming guide may be adjusted to cover a time period of the day. For example, a viewer may adjust a position of the time toolbar to a desired time period of the day. Specifically, the viewer may adjust the position of the time toolbar to 7 p.m., the interactive programming guide may provide a list of TV programming showing at 7 p.m. Also, a viewer may adjust a span of the time toolbar to cover one or more hours of the day. For example, the viewer may adjust the span of the time toolbar to cover 3 hours of the day and the viewer may adjust the position of the time toolbar to 7 p.m. to 10 p.m. The interactive programming guide may provide a list of TV programming between 7 p.m. to 10 p.m. of the selected one or more days.

The time module 206 may also provide one or more quick buttons associated with the interactive programming guide. For example, the time module 206 may provide one or more pre-programmed and/or programmable quick buttons for the interactive programming guide. For example, one or more pre-programmed and/or programmable quick buttons may include "Now," "Morning," "Prime Time," "Late Night," "Morning News," "Cartoon," etc. In an exemplary embodiment, the time module 204 may provide a "Now" quick button associated with the interactive programming guide, wherein a viewer may click on the "Now" quick button and the interactive programming guide may provide the viewer with a listing of TV programming for the current time the viewer is using the interactive programming guide. Also, the time module 206 may provide a "Morning" quick button associated with the interactive programming guide, wherein a viewer may click on the "Morning" button and the interactive programming guide may provide the viewer with a list of TV programming for the morning (e.g., 5 hours from 6 a.m. to 11 a.m.) of the one or more days selected by the viewer. Further, the time module 206 may provide a "Prime Time" quick button associated with the interactive programming guide, wherein a viewer may click on the "Prime Time" button and the interactive programming guide may provide the viewer with a list of TV programming for the prime time (e.g., 3 hours from 8 p.m. to 11 p.m.) of the one or more days selected by the viewer. Furthermore, the time module 206 may provide a "Late Night" quick button associated with the interactive programming guide, wherein a viewer may click on the "Late Night" button and the interactive programming guide may provide the viewer with a list of TV programming for the late night (e.g., two and half hour from 11:30 p.m. to 2 a.m.) of the one or more days selected by the viewer. In another exemplary embodiment, the time module 206 may allow a viewer to customize one or more quick buttons associated with the interactive programming guide. For example, a viewer may customize a "Morning News" (e.g., 5 a.m. to 10 a.m.) quick button associated with the interactive programming guide, wherein the interactive programming guide may provide the viewer with a list of TV programming for the time period (e.g., 5 a.m. to 10 a.m.) of the one or more days selected by the viewer. Also, a viewer may customize a "Soap Opera" (e.g., 1 p.m. to 4 p.m.) quick button associated with the interactive programming guide, wherein the interactive programming guide may provide the viewer with a list of TV programming for the time period (e.g., 1 p.m. to 4 p.m.) of the one or more days selected by the viewer. Moreover, a viewer may customize a "Cartoon" (e.g., 4 p.m. to 6 p.m. on weekdays, 6 a.m. to 11 a.m. on weekends) quick button associated with the interactive programming guide, wherein the interactive programming guide may provide the viewer with a list of TV programming for the time period (e.g., 4 p.m. to 6 p.m. on weekdays, 6 a.m. to 11 a.m. on weekends) of the one or more days selected by the viewer. The time module 206 may store the viewer customized quick buttons associated with the interactive programming guide for a period of time.

Referring to FIG. 2 again, the communication module 202 may transfer the TV programming schedule information to the viewer interface module 208. Also, the date module 204 and/or the time module 206 may transfer the sorted TV programming schedule information to the viewer interface module 208. Further, the date module 204 and/or the time module may transfer one or more quick buttons to the viewer interface module 208. The viewer interface module 208 may assemble the sorted TV programming schedule information from the date module 204 and the time module 204 into an interactive programming guide, which will be described further in detail below. In an exemplary embodiment, the interactive programming guide may include one or more program icons arranged in rows and columns. Also, the viewer interface module 208 may load the one or more program icons with TV programming schedule information. For example, the one or more program icons may include the title, starting time, duration, a rating (e.g., feedback rating by viewers, program rating), date of release, actors/actress, a brief description and/or other information related to one or more programming. The viewer interface module 208 may provide the one or more program icons having TV programming schedule information based at least in part on the date and/or the time of the TV programming. The viewer interface module 208 may arrange one or more program icons in a chronological order. For example, the viewer interface module 208 may arrange one or more program icons in order of date (e.g., January 1, January 2, January 3, etc) on a horizontal axis and/or the time of the date (12 a.m., 1 a.m., 2 a.m., etc) on a vertical axis, or vice versa. In an exemplary embodiment, the viewer interface module 208 may enable a viewer to take one or more actions. For example, the one or more actions enabled by the viewer interface module 208 may include preview, schedule a recording, add reminder, add to bookmark (e.g., a favorite list of programming), show future repeats (e.g., check future airing date/time), and/or other actions to enhance a viewing experience for the viewer.

In another exemplary embodiment, the viewer interface module 208 may enable a viewer to search one or more TV programming within the interactive programming guide. For example, the viewer interface module 208 may allow a viewer to search TV programming by query by one or more categories including actors/actress, genres (e.g., action, drama, family, kids, movies, sports, pay-per-view, etc), title, channel, etc. A viewer may query a name of the actor/actress and the viewer interface module 208 may provide the viewer with a TV programming listing associated with the queried actors/actress. Also, a viewer may query a genre and the viewer interface module 208 may provide the viewer with a TV programming listing associated with the queried genre. Further, a viewer may query a title of the TV programming, the viewer interface module 208 may provide the viewer with TV programming schedule information associated with the queried TV programming. Moreover, a viewer may query a channel (e.g., channel number and/or channel name) and the viewer interface module 208 may provide the viewer with a list of TV programming shown on the queried channel. In addition, in the event that a viewer may not know the full name, proper spelling of the queried entry (e.g., full name of actors/actress, the full name of a genre, the full title of the TV programming, and/or the full name of the channel, etc.), the viewer may enter a partial query entry. The interactive programming guide server 104 may provide one or more suggestions based at least in part on the partial entry to the viewer.

The viewer interface module 208 may transmit the interactive programming guide to the display module 210. The display module 210 may cause the display of the interactive programming guide and various user interfaces at the display device 112. In an exemplary embodiment, a receiver module 212 may receive a feedback signal including query information from various user interfaces to identify one or more selections of the viewer for the interactive programming guide. Also, the query information provided by the viewer may be transmitted to the viewer interface module 210 for processing.

FIG. 3 illustrates a screenshot of an interactive programming guide, in accordance with exemplary embodiments. In an exemplary embodiment, the content provider 102 may provide the interactive programming guide server 104 with TV programming schedule information associated with a period of time. For example, as shown in FIG. 3, the content provider 102 may provide TV programming schedule information from January 29 to February 12 to the interactive programming guide server 104. The interactive programming guide server 104 may store the TV programming schedule information for a period of time to be displayed to a viewer. Also, the set-top box 110 and/or the display device 112 may download the TV programming schedule information from the interactive programming guide server 104. A viewer may select to display TV programming schedule information associated with desired dates/times of the period of TV programming schedule information provided by the content provider 102. In an exemplary embodiment, a viewer may want to display TV programming schedule information associated with the desired dates/times within the time period of TV programming schedule information provided by the content provider 102 by adjusting a position of a date toolbar and/or a time toolbar. For example, a viewer may select to view the TV programming schedule information for one or more dates by adjusting the date toolbar to the corresponding dates. The viewer may adjust the date toolbar to view the TV programming schedule information for the date of January 30. Also for example, viewer may select to view the TV programming schedule information associated with a time period of the day by adjusting the time toolbar to the corresponding time period of the day. The viewer may adjust the time toolbar to select to view the TV programming schedule information from 8 p.m. to 12 p.m. The interactive programming guide may display the TV programming schedule information associated with January 30, from 8 p.m. to 12 p.m.

Figures 4A, 4B:
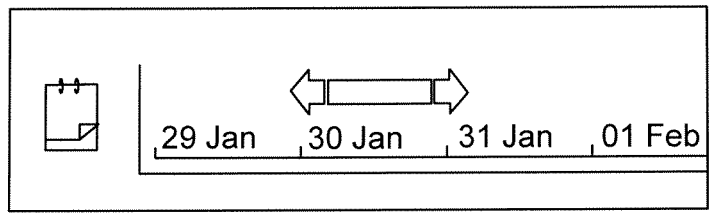
Figure 4C:
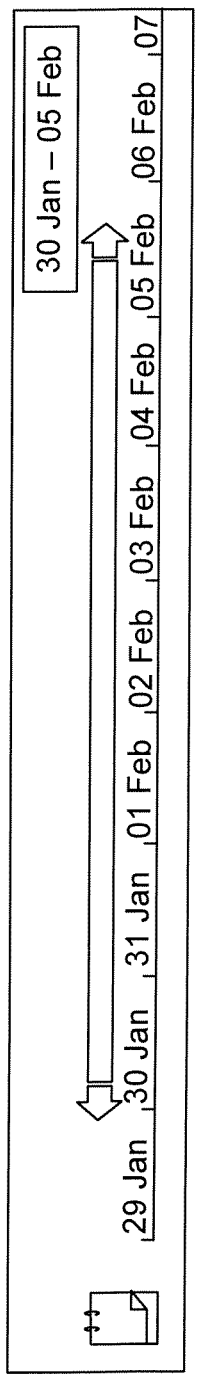

FIGS. 4A-4D depict screenshots of the date toolbar of an interactive program guide, in accordance with exemplary embodiments. As illustrated in FIG. 4A, a viewer may slide the date toolbar to January 30 to view the associated TV programming schedule information. FIG. 4B illustrates an interactive programming guide where a viewer may slide the time toolbar to 8 p.m. to view the associated TV programming schedule information. In an exemplary embodiment, a viewer may drag (e.g., using a mouse) the date toolbar and/or the time toolbar to a desired period of time. Also, a viewer may input (e.g., using a remote control) a desired period of time to for the date toolbar and/or the time toolbar to adjust a position of the date toolbar and/or the time toolbar. As illustrated in FIG. 4C, a viewer may select a plurality of days, a viewer may increase a span of the date toolbar to include a plurality of days. In an exemplary embodiment, a viewer may click (e.g., using a mouse) on an edge portion of the date toolbar and/or the time toolbar and drag the edge portion of the date toolbar and/or the time toolbar to cover a desired span of time. Also, a viewer may input (e.g., using a remote control) a desired span of time to for the date toolbar and/or the time toolbar to adjust a span of the date toolbar and/or the time toolbar. Further, a viewer may select to view TV programming schedule information associated with a plurality of hours of the selected dates. A viewer may increase a span of the date toolbar to include dates from January 30 to February 5. Also, a viewer may increase a span of the time toolbar to include times from 8 p.m. to 9 p.m. As illustrated in FIG. 4D, the interactive programming guide may display TV programming schedule information from January 30 to February 5 for the time between 8 p.m. to 9 p.m.

Figures 5A, 5B:
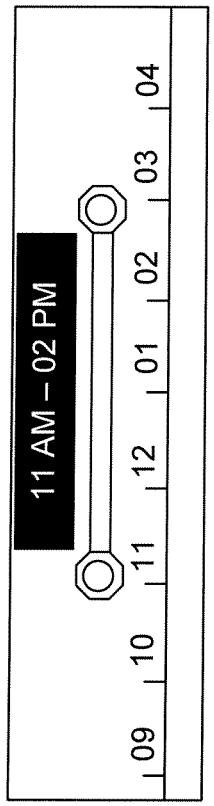
FIGS. 5A-5B depict screenshots of time toolbars of an interactive program guide, in accordance with exemplary embodiments.

FIGS. 5A-5B depict screenshots of the time toolbar of an interactive program guide, in accordance with exemplary embodiments. As described above, a viewer may view TV programming schedule information for a time period and/or duration of a time period by adjusting a position and/or a span of the time toolbar, respectively. FIG. 5A illustrates that a viewer may adjust the time toolbar to view TV programming schedule information for a period of three hours from 12 p.m. to 3 p.m. of the day. FIG. 5B illustrates the interactive programming guide displaying TV programming schedule information for three hours from 12 p.m. to 3 p.m.

FIG. 6 depicts a screenshot of a pop-up programming icon of an interactive program guide, in accordance with exemplary embodiments. A viewer may select one or more program icons to obtain detailed TV programming schedule information. For example, a viewer may click (e.g., using a mouse) on a programming icon of the interactive program guide to display the pop-up window. Also, a viewer may scroll (e.g., using an arrow key on a remote control) to choose a programming icon of the interactive program guide to display the pop-up window. As illustrated in FIG. 6, the one or more program icons may display detailed TV programming schedule information in a separate pop-up window. Also, the pop-up window of the one or more program icons may display one or more buttons to enable a viewer to take one or more options and/or actions. In an exemplary embodiment, the pop-up window may allow a viewer to schedule a recording of the TV programming. Also, the one or more viewer enabled actions of the pop-up window may allow a viewer to add one or more reminders to the calendar. The reminder may send an alert and/or an email to the viewer, for example of a show time of one or more TV programming. Further, the one or more viewer enabled actions of the pop-up window may allow a viewer to show future repeats, wherein the viewer may view one or more future show time associated with one or more repeated TV programming. Moreover, the one or more viewer enabled actions of the pop-up window may allow a viewer to add the TV programming to a bookmark (e.g., a list of favorite TV programming). The bookmark feature allows the viewer to retrieve one or more favorite TV programming more efficiently. In addition, the pop-up window may allow a viewer to preview (e.g., a trailer) the TV programming to determine whether to watch the TV programming. The pop-up window may also display a brief description of the TV programming to inform a viewer of the content of the TV programming. To exit the pop-up window, a viewer may select a close button associated with the pop-up window. As illustrated in FIG. 6, the pop-up window displaying the TV programming schedule information associated with the "GoodFellas" programming. The pop-up window may display the title, a starting time, duration and/or a channel for displaying the "GoodFellas" programming. The pop-up window may also display the cast of the "GoodFellas", for example, Robert De Niro, Joe Pesci, Ray Liotta, and Lorraine Bracco. The pop-up window may display a rating (e.g., Restricted (R) rating) and/or a year of release (e.g., 1990) for the "GoodFellas" programming. The pop-up window may furthermore display a brief description of the "GoodFellas" programming. Moreover, the pop-up window may display one or more actions (e.g., schedule recording, add reminder, show future repeats, and/or add to bookmark).

Figures 7A, 7B:
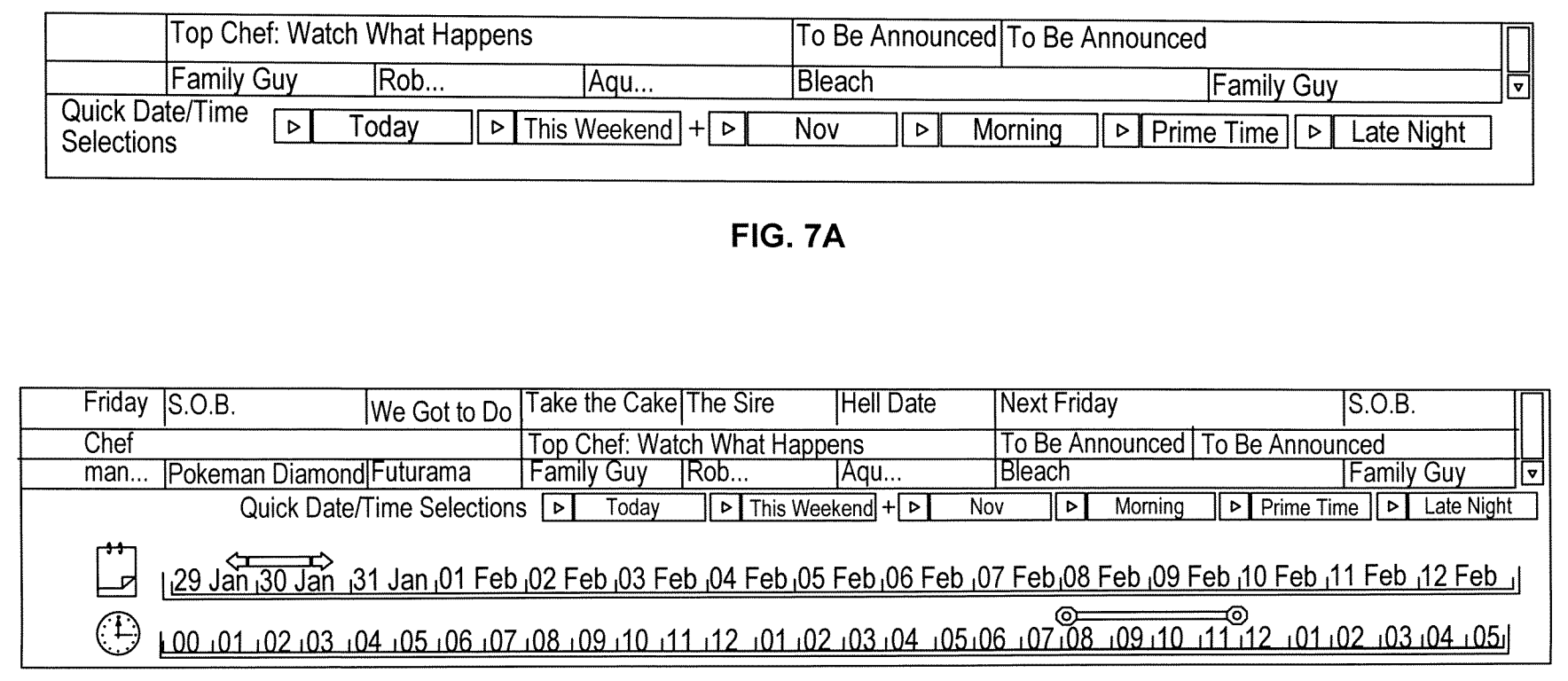

FIGS. 7A-7B depict screenshots of one or more quick buttons of an interactive programming guide, in accordance with exemplary embodiments. In an exemplary embodiment, an interactive programming guide may include one or more quick buttons. For example, the interactive programming guide may include a "Today" and/or "This Weekend" quick buttons. A viewer may select the "Today" quick button to display TV programming schedule information associated with the date that the viewer is using the interactive programming guide. For example, the date toolbar may be automatically adjusted to a span of one day and/or may be positioned at the date that the viewer is using the interactive programming guide. Also, a viewer may select the "This Weekend" quick button to display TV programming schedule information associated with the next weekend from the date that the viewer is using the interactive programming guide. For example, the date toolbar may be automatically adjusted to a span of three days (e.g., Friday to Sunday) and may be adjusted to a position at the next weekend from the date that the viewer is using the interactive programming guide. In another exemplary embodiment, an interactive programming guide may include a "Now" quick button, a "Morning" quick button, a "Prime Time" quick button, and/or a "Late Night" quick button. A viewer may select one or more quick buttons to automatically adjust a time toolbar of the interactive programming guide. For example, a viewer may select the "Now" quick button, where the span of the time toolbar may be adjusted to one hour and positioned at the time the viewer is using the interactive programming guide. Also, a viewer may select the "Morning" quick button, wherein the span of time toolbar may be adjusted to four hours and may be positioned at an earlier morning time (e.g., 6 a.m. to 10 a.m. or 7 a.m. to 11 a.m.). Further, a viewer may select the "Prime Time" quick button, wherein the span of the time toolbar may be adjusted to three hours and may be positioned at start of a prime time (e.g., 8 p.m. to 11 p.m.). In addition, a viewer may select the "Late Night" quick button, wherein the span of the time toolbar may be adjusted to three hours and may be positioned at a late night time (e.g., 11:30 p.m. to 2:30 a.m.). Thus, the interactive programming guide may display the TV programming schedule information associated with a date and/or a time selected by the viewer.

Figures 8A, 8B:
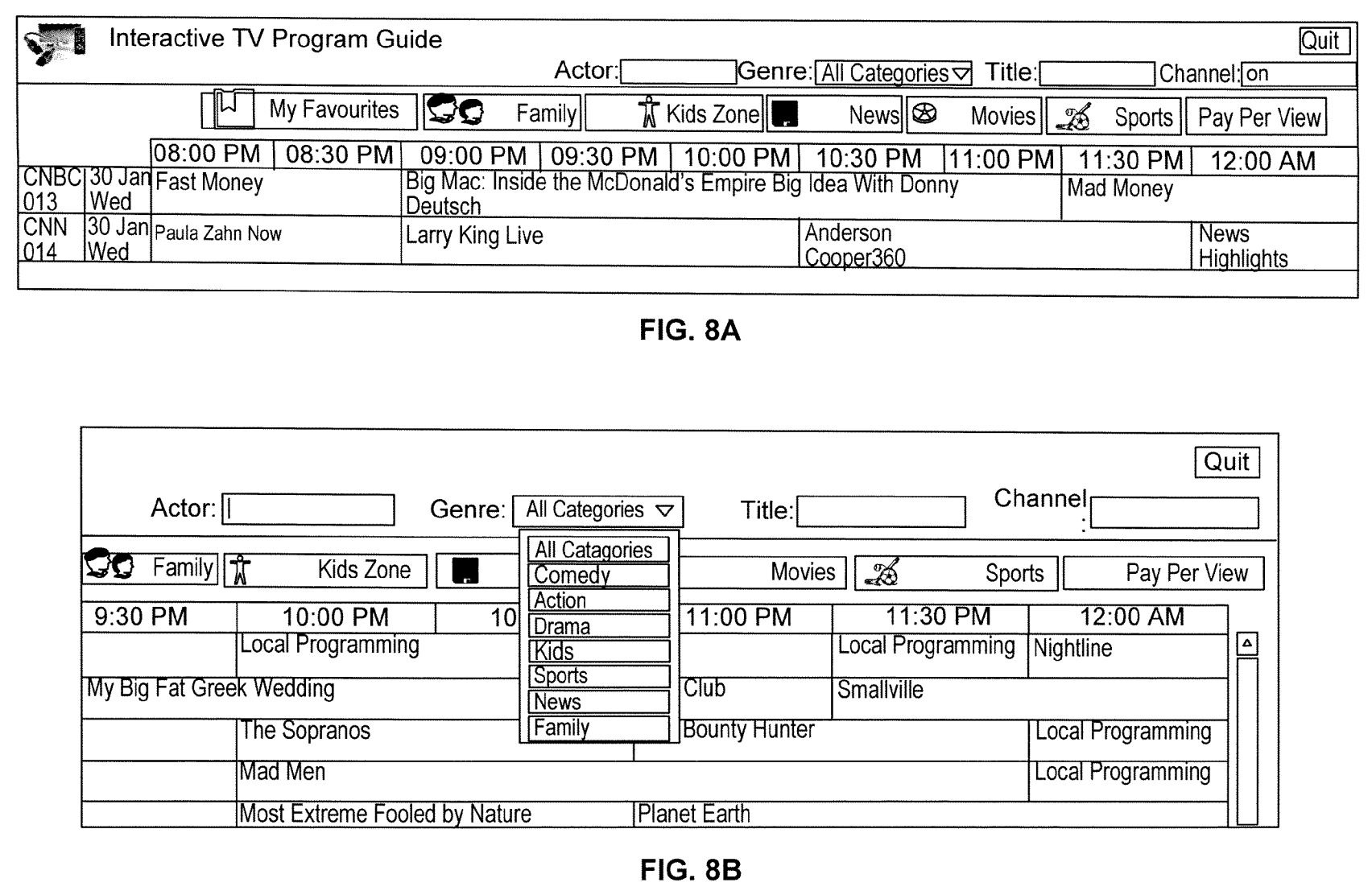

FIGS. 8A-8B depict screenshots of one or more queries of an interactive programming guide, in accordance with exemplary embodiments. In an exemplary embodiment, the interactive programming guide may allow a viewer to query for TV programming schedule information. For example, a viewer may query for TV programming schedule information via actor/actress name, genres, title, channel and/or other method of identifying TV programming schedule information. As illustrated in FIG. 8A, a viewer may query for TV programming schedule information via channel identification (e.g., NBC, FOX, ABC, CBS, CNBC, CNN, etc.). The interactive programming guide may display the TV programming schedule information associated with the viewer query channel and/or selected date and/or time. Also as illustrated in FIG. 8B, a viewer may query TV programming schedule information by selecting a genre. The viewer may select one or more genres of TV programming and the interactive programming guide may display TV programming schedule information associated with the selected genre.

It should be appreciated that any of the screens described above with respect to FIGS. 3-8 may be of varying sizes, shapes, colors, fonts, or other stylistic features, and may be positioned at various locations on the display device 112. In one embodiment, for example, the screenshots described in FIGS. 3-8 may take up the entire screen. In another embodiment, the screenshots described in FIGS. 3-8 may be smaller, overlayed, or put in the corner of the display device 112, e.g. a pop-up window, picture-in-picture (PIP). The screenshots described in FIGS. 3-8 may also be personalized or customized to the preferences of different users. Other various embodiments may also be provided.

FIG. 9 depicts a flowchart for providing an interactive programming guide, in accordance with exemplary embodiments. This exemplary method is provided by way of example, as there are a variety of ways to carry out methods disclosed herein. The method 900 shown in FIG. 9 can be executed or otherwise performed by one or a combination of various systems. The method 900 is described below as carried out by the system 100 shown in FIGS. 1 and 2 by way of example, and various elements of the system 100 are referenced in explaining the example method of FIG. 9. Each block shown in FIG. 9 represents one or more processes, methods, or subroutines carried in the exemplary method 900. The method 900 may begin at block 902.

At block 902, the method 900 may include receiving a request for TV programming schedule information via an interactive programming guide. For example, an interactive programming guide server 104 may receive a request for TV programming schedule information from a viewer. The interactive programming guide server 104 may transmit the viewer request to a content provider 102. The method may continue to block 904.

At block 904, the content provider 102 may provide TV programming schedule information associated with a period of time to the interactive programming guide server 104. For example, the content provider 102 may process the viewer request for TV programming schedule information. The content provider 102 may provide the interactive programming guide server 104 a period of TV programming schedule information. For example, the content provider 102 may provide the interactive programming guide server 104 with two weeks of TV programming schedule information. Also, the period of TV programming schedule information may be predetermined and/or selected by a viewer. The method may continue to block 906.

At block 906, a viewer may adjust a date toolbar and/or a time toolbar associated with the interactive programming guide to display a desired TV programming schedule information. For example, a viewer may adjust a position of the date toolbar and/or the time toolbar to a desired date and/or time to display the requested TV programming schedule information. Also, a viewer may adjust a span of the date toolbar and/or the time toolbar to display a desired time period of the requested TV programming schedule information. Further, the interactive programming guide may allow a viewer to query for TV programming schedule information based at least in part on program information, programming categories, actors/actress, genres (e.g., action, drama, family, movies, sports, pay-per-view, etc), titles, channels, reviews, social network information, event/show statistics, broadcast duration, ratings, popularity, closed-captioning information, etc. Moreover, a viewer may select one or more quick buttons to adjust a position and/or a time period of the TV programming schedule information. The method of 900 may proceed to block 908.

At block 908, the viewer may select one or more program icons to obtain the desired TV programming schedule information. The viewer may select one or more program icons arranged based on the viewer requested date and/or time in the interactive programming guide. For example, the viewer may select one or more program icons to display desired TV programming schedule information.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
receiving a request for TV programming schedule information via an interactive programming guide;
obtaining the TV programming schedule information associated with a period of time;
displaying one or more program icons having the TV programming schedule information associated with the interactive programming guide, wherein the one or more program icons comprise one or more buttons to enable a viewer to take one or more actions including at least one of schedule recording, add reminder, and show future repeats;
adjusting a position and a span of a date toolbar for selecting a plurality of dates within the period of time in response to receiving one or more commands;
adjusting a position and a span of a time toolbar for selecting one or more time periods of a day in response to receiving one or more commands; and
displaying at least one of the date toolbar, the time toolbar, and the one or more program icons having the TV programming schedule information associated with the interactive programming guide based at least on one of the selected plurality of dates and the selected one or more time periods of the day, wherein the position and span of at least one of the date toolbar and the time toolbar is adjusted based at least in part on a selection of one or more quick buttons, wherein the one or more quick buttons comprises at least one of a quick button that specifies a single day, a quick button that specifies multiple days, and a quick button that specifies a particular portion of a day, wherein the position and span of at least one of the date toolbar and the time toolbar associated with the selection of the one or more quick buttons are customizable by a user.

2. The method of claim 1, wherein the TV programming schedule information includes at least one of a date, a time, program information, programming categories, actors/actresses, genres, titles, channels, reviews, social network information, event/show statistics, broadcast duration, ratings, popularity, and closed-captioning information.

3. The method of claim 1, wherein the period of time is determined by the viewer.

4. The method of claim 1, wherein the period of time is predetermined by a content provider.

5. The method of claim 1, further comprising selecting the one or more program icons associated with the interactive programming guide to display the TV programming schedule information associated with the selected icons.

6. The method of claim 1, further comprising adjusting a span of the time toolbar for selecting the one or more time periods of the day.

7. The method of claim 1, further comprising adjusting a position of the date toolbar within the period of time.

8. The method of claim 1, further comprising adjusting a position of the time toolbar within the one or more time periods of the day.

9. The method of claim 1, further comprising querying the TV programming schedule information based at least on one of actors/actresses, a genre, a title, and a channel.

10. The method of claim 1, wherein the one or more quick buttons further comprises at least one of a today quick button and a weekend quick button.

11. The method of claim 10, wherein the one or more quick buttons further comprise at least one of a weekly quick button, a 10-days quick button, and a 4-day quick button.

12. The method of claim 1, wherein the one or more quick buttons further comprises at least one of a now quick button, a morning quick button, a prime time button and a late night button.

13. The method of claim 12, wherein the one or more quick buttons further comprise at least one of a soap opera quick button, a cartoons quick button, and a morning news quick button.

14. A non-transitory computer readable media comprising code to perform the steps of the methods of claim 1.

15. The method of claim 1, wherein the position and span of the date toolbar associated with the selection of the one or more quick buttons includes at least one date prior to a current date.

16. The method of claim 1, wherein the position and span of the date toolbar associated with the selection of the one or more quick buttons includes at least one date subsequent to a current date.

17. The method of claim 1, wherein the one or more quick buttons are stored for a predetermined period of time.

18. A system, comprising:
a receiver module to receive a request for TV programming schedule information;
a communication module to receive the TV programming schedule information associated with a period of time;
a viewer interface module to load the TV programming schedule information associated with the period of time into one or more program icons associated with the interactive programming guide to be displayed, wherein the one or more program icons comprise one or more buttons to enable a viewer to take one or more actions including at least one of schedule recording, add reminder, and show future repeats;
a date module to adjust a position and a span of a date toolbar for selecting a plurality of dates in response to receiving one or more commands;
a time module to adjust a position and a span of a time toolbar for selecting one or more time periods of a day in response to receiving one or more commands; and
a display module to display via a display device at least one of the date toolbar, the time toolbar, and the one or more program icons having the TV programming guide information associated with the interactive programming guide based at least on one of the selected plurality of dates and the selected one or more time periods of the day, wherein at least one of the date module and time module adjust the position and span of at least one of the date toolbar and the time toolbar based at least in part on a activation of one or more quick buttons, wherein the one or more quick buttons comprises at least one of a quick button that specifies a single day, a quick button that specifies multiple days, and a quick button that specifies a particular portion of a day, wherein the position and span of at least one of the date toolbar and time toolbar associated with the activation of the one or more quick buttons are customizable by a user.

* * * * *